(12) United States Patent
Smith et al.

(10) Patent No.: US 6,388,573 B1
(45) Date of Patent: May 14, 2002

(54) MOTION DETECTION SYSTEM AND METHODOLOGY FOR ACCOMPLISHING THE SAME

(76) Inventors: Jerry R. Smith, 5690 W. Rowland Ave., Littleton, CO (US) 80123; Charles D. Angert, 3645 Jeannine Dr., Suite 106, Colorado Springs, CO (US) 80917

( * ) Notice: Subject to any disclaimer, the term of this patent is extended or adjusted under 35 U.S.C. 154(b) by 0 days.

(21) Appl. No.: 09/271,091

(22) Filed: Mar. 17, 1999

(51) Int. Cl.[7] ............................................. G08B 13/18
(52) U.S. Cl. ................... 340/556; 340/541; 340/545.3; 250/221; 250/222.1
(58) Field of Search .................. 340/556, 557, 340/555, 552, 540, 541, 545.3; 250/221, 222.1

(56) References Cited

U.S. PATENT DOCUMENTS

| | | | |
|---|---|---|---|
| 4,000,400 A | | 12/1976 | Elder |
| 4,764,755 A | * | 8/1988 | Pedtke et al. ............... 340/529 |
| 4,794,248 A | * | 12/1988 | Gray .......................... 250/221 |
| 4,799,243 A | | 1/1989 | Zepke |
| 4,853,531 A | * | 8/1989 | Rejc .......................... 250/221 |
| 4,896,606 A | * | 1/1990 | De Coi ....................... 102/213 |
| 4,967,083 A | * | 10/1990 | Kornbrekke et al. ........ 250/341 |
| 5,233,185 A | | 8/1993 | Whitaker |
| 5,243,183 A | * | 9/1993 | Barron, Jr. et al. .......... 250/221 |
| 5,254,853 A | | 10/1993 | Reich |
| 5,305,390 A | * | 4/1994 | Frey et al. ................... 340/556 |
| 5,393,978 A | * | 2/1995 | Schwarz ...................... 250/353 |
| 5,585,625 A | * | 12/1996 | Spies .......................... 250/221 |
| 5,786,760 A | * | 7/1998 | Suzuki et al. ............... 340/541 |
| 6,243,006 B1 | * | 6/2001 | Rejc et al. ................... 340/436 |

* cited by examiner

*Primary Examiner*—Nina Tong
(74) *Attorney, Agent, or Firm*—Timothy J. Martin; Michael R. Henson; Mark H. Weygandt

(57) ABSTRACT

A motion detection system for detecting an object's movement through a threshold in a selected direction comprises first and second transmitters for producing respective broadcast signals across the threshold along respective transmission paths, a receiver circuitry operative in an absence of movement through the threshold to receive the broadcast signals and generate a receiver circuitry reference signal, and operative upon interruption of both broadcast signals within a selected period of time to generate receiver circuitry interrupted output corresponding to movement of the object, respectively, through first and second transmission paths. Processing circuitry monitors the receiver circuitry and operates upon detection of the receiver circuitry interrupted output to produce an event detection signal, and output circuitry responds to generate selected output, thereby indicating movement of the object through the threshold in one of two movement directions. A methodology of detecting object movement through a threshold is also provided.

31 Claims, 8 Drawing Sheets

MOTION DETECTION SYSTEM AND METHODOLOGY FOR ACCOMPLISHING THE SAME

FIELD OF THE INVENTION

The present invention broadly relates to motion detectors and is particularly directed to motion detection systems adapted for use in detecting directional movement of an object through a threshold and for generating a selected audio or video output in response thereto.

BACKGROUND OF THE INVENTION

The use of motion detectors is widely known in the prior art. Indeed, motion detectors have been employed in a variety of applications in the past for the purpose of monitoring movement of an object within a confined region. One of the predominate applications for motion detectors is to detect the presence of an individual. For example, the entrances to many retail stores are provided with motion detectors which either audibly or visually indicate to store personnel when customers enter and leave the store. Retail stores also employ similar systems as a security measure, for example, to alert store personnel of a potential theft when a customer leaves the store with an item which has not been purchased.

The concept of motion detection is, in fact, widely employed in many security systems. For example, motion detectors are predominant in home security systems to detect the presence of burglars. Such devices are regularly found both inside the home and outside the home and, once activated, are operative to trigger an alarm or other appropriate signal to indicate the presence of an unauthorized individual. Various types of personal items, such as brief cases, automobiles and the like, are particularly subject to theft and many prior proposals are directed to the requirements for protecting such items.

Despite the proliferation of motion detectors for use in a variety of different applications, it has not heretofore been known to employ motion detectors specifically for the purpose of detecting directional movement of an object through a threshold. Such a motion detection system which discriminates between directional movement could be used in a variety of different applications to provide output data indicative of the directional movement. For example, a directional sensing device could be utilized in retail stores to provide valuable information to business owners. To illustrate, business owners could use information reflecting the accumulated number of customers entering the store, or passing by a particular display within the store, to devise improved marketing strategies. Such information, when compared to the number of sales generated over the same period of time, might also be indicative of the success of various types of advertising schemes as well as the work performance of store personnel. On an individual level, a homeowner could use such a directional sensing device, for example, to trigger a selected event, such as the opening or closing of a garage door upon movement of a vehicle across the threshold.

Regardless of its particular application, it would desirable to improve upon existing motion detection technology by providing a motion detection system which discerns directional movement of an object and generates a selected output in response thereto. The present invention is directed to meeting these needs.

SUMMARY OF THE INVENTION

It is an object of the present invention to provide a new and improved motion detection system adapted for use in detecting movement of an object in selected movement direction through a threshold.

Another object of the present invention is provide such a motion detection system which indicates directional movement of the object through the threshold either audibly, visually or both;

A further object of the present invention is to provide a motion detection system which visually indicates accumulated occurrences of motion through the threshold in a selected movement direction;

Yet another object of the present invention is to provide a new and improved motion detection system which may be situated proximately to an entryway to detect directional movement of an object, while providing desired output at a remote location in response to such movement;

Still a further object of the present invention is to provide a motion detection system which is relative easy to construct and inexpensive to manufacture;

It is still a further object of the present invention to provide a new and improved method of detecting directional movement of an object through a threshold.

In accordance with these objectives, a motion detection system is provided and adapted for use in detecting directional movement of an object through a threshold. According to an exemplary embodiment of the present invention, the motion detection system broadly comprises first and second transmitters each operative to produce first and second broadcast signals, respectively, along first and second transmission paths that cross the threshold. A receiver circuitry operates in an absence of movement of the object through the threshold to receive the first and second broadcast signals and to generate a receiver circuitry reference signal. The receiver circuitry is further operative upon interruption by the object of both the first and second broadcast signals within a selected period time to generate a receiver circuitry interrupted output, corresponding to movement of the object, respectively, through the first and second transmission paths. Processing circuitry monitors the receiver circuitry and operates in response to detection of the receiver circuitry interrupted output corresponding to movement of the object in either a first or second movement direction, to produce an event detection signal. Output circuitry receives the event detection signal and generates a selected output in response thereto, thereby to indicate directional movement of the object in at least one of the first and second movement directions.

In another embodiment of the present invention, the processing circuitry produces a plurality of event detection signals, and a plurality of output circuits are provided for receiving a respective one of the event detection signals and generating selected output in response thereto. Here, a switching circuitry is provided which includes a plurality of switch elements each having a first switch mode wherein a respective one of the output circuits is activated and a second switch mode wherein a respective one of the output circuits is inactivated.

Preferably, the first and second broadcast signals are each pulsating signals having a selected broadcast signal frequency and amplitude. Each of the first and second broadcast signal frequencies is preferably in the infra-red range. To this end, the first and second transmitters may be infra-red light emitted diodes. It is also preferred that the first and second broadcast signals be 180° out of phase with respect to one another with the output of the receiver circuitry being a composite of the first and second broadcast signals.

The output circuitry may be in the form of a visual display which visually indicates each occurrence of movement through the threshold in at least one of the first and second movement directions. It is preferred that the event detection signal generated by the processing circuitry contain serial data so that the visual display can numerically indicate accumulated occurrences through the threshold in a desired movement direction. A reset circuit may be associated with the visual display to clear the display, as desired.

Alternatively, the output circuitry may be in the form of an audio circuit which audibly indicates each occurrence of movement through the threshold in at least one of the first and second movement directions. Here, the audio circuit may transmit a selected pre-recorded message upon each occurrence of movement through the threshold. Preferably, the audio circuit includes a programmable integrated circuit device and a speaker element providing this annunciation capability. Preferably also, the audio circuit includes an external microphone element and a record switch adapted for use therewith, such that the integrated circuit device is operative upon actuation of the record switch to store voice messages received by the microphone element into memory.

In order to discriminate directional movement, a direction indicator switch may be provided, with this indicator switch operative in first mode to cause the processing circuitry to produce the event detection signal only upon movement of the object through the threshold in the first movement direction, and operative in a second switch mode to cause the processing circuitry to produce the event detection signal only upon movement in the second movement direction.

Where the motion detection system of the present invention is employed in an entryway, the first and second transmitters and the receiver circuitry may be contained within a common housing positioned on one side of the threshold, with the receiver circuitry including a receiver preferably interposed between the first and second transmitters. With such a construction, a reflector element is provided on an opposite side of the threshold such that the first and second broadcast signals are reflected toward the receiver circuitry. The present invention, though, also contemplates an alternative arrangement wherein the transmitters are located across the threshold from the receiver circuitry. Regardless of the particular configuration, the selected output circuitry may be either contained within the housing or located remotely thereof.

The present invention also contemplates a methodology for detecting movement of an object through a threshold in a selected movement direction. Here, the methodology broadly comprises the steps of: (1) transmitting first and second broadcast signals across the threshold along respective first and second transmission paths; (2) generating an event detection signal upon sequential interruption of the first and second broadcast signals within a selected period of time; and (3) generating a selected output in response to the event detection signal.

BRIEF DESCRIPTION OF THE DRAWINGS

FIGS. 5(a)–5(d) are each portions of a circuit diagram which collectively show the preferred circuitry for implementing the motion detection system according to the first exemplary embodiment of the present invention, of which:

FIG. 5(a) is the transmitter/receiver system circuitry, the processing circuitry and the switching circuitry;

FIG. 5(b) is a representative visual output circuitry;

FIG. 5(c) is a representative audio output circuitry; and

FIG. 5(d) is the power supply;

DETAILED DESCRIPTION OF THE EXEMPLARY EMBODIMENTS

The present invention is directed to motion detectors adapted for use in detecting movement of an object through a threshold and producing an output in response thereto. More particularly, the present invention concerns a motion detection system which is more versatile than existing devices in that it is capable of discriminating between movement in different directions, as defined by a user, and producing desired output(s) in response to directional movement, as also defined by the user.

Figure 1:
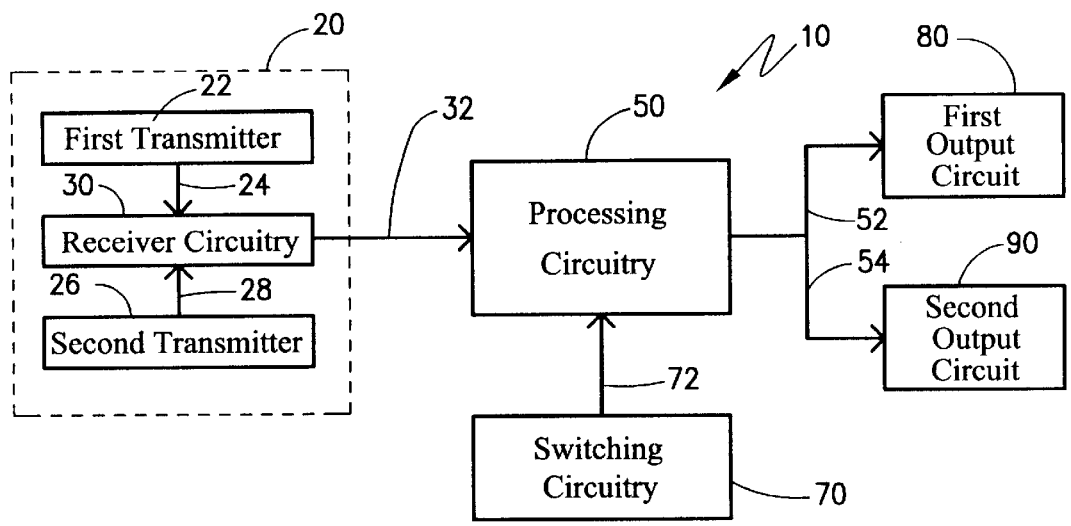
FIG. 1 is a block diagram showing, in simplified form, the general structure of the motion detection system according to a first exemplary embodiment of the present invention.

The principal features of the motion detection system 10 according to the first exemplary embodiment of the present invention are diagrammed in FIG. 1. Here, it may be seen that the circuitry includes a transmitter/receiver subcircuitry 20 having first and second transmitters 22 and 26, respectively, and a receiver circuitry 30. First transmitter 22 is operative to produce a first broadcast signal 24 and second transmitter 26 is operative to produce second broadcast signal 28. Receiver circuitry 30 is adapted to receive the first and second broadcast signals 24 and 28 and generate a selected receiver circuitry output 32 which is then presented to a processing circuitry 50. As will be appreciated in the description to follow, receiver circuitry output 32 may have different characteristics depending upon the particular sequence of interruption of the first and second broadcast signals 24 and 28. Processing circuitry 50 monitors receiver circuitry 30 and operates in response to detection of a receiver circuitry interrupted output 32 to produce one or more event detection signals, 52 and 54, which may be respectively presented to a first output circuit 80 and/or a second output circuit 90. Motion detection system 10 also includes a switching circuitry 70 operative to communicate with processing circuitry 50 via communication line 72 to selectively toggle various input and output parameters of system 10.

Figure 2:
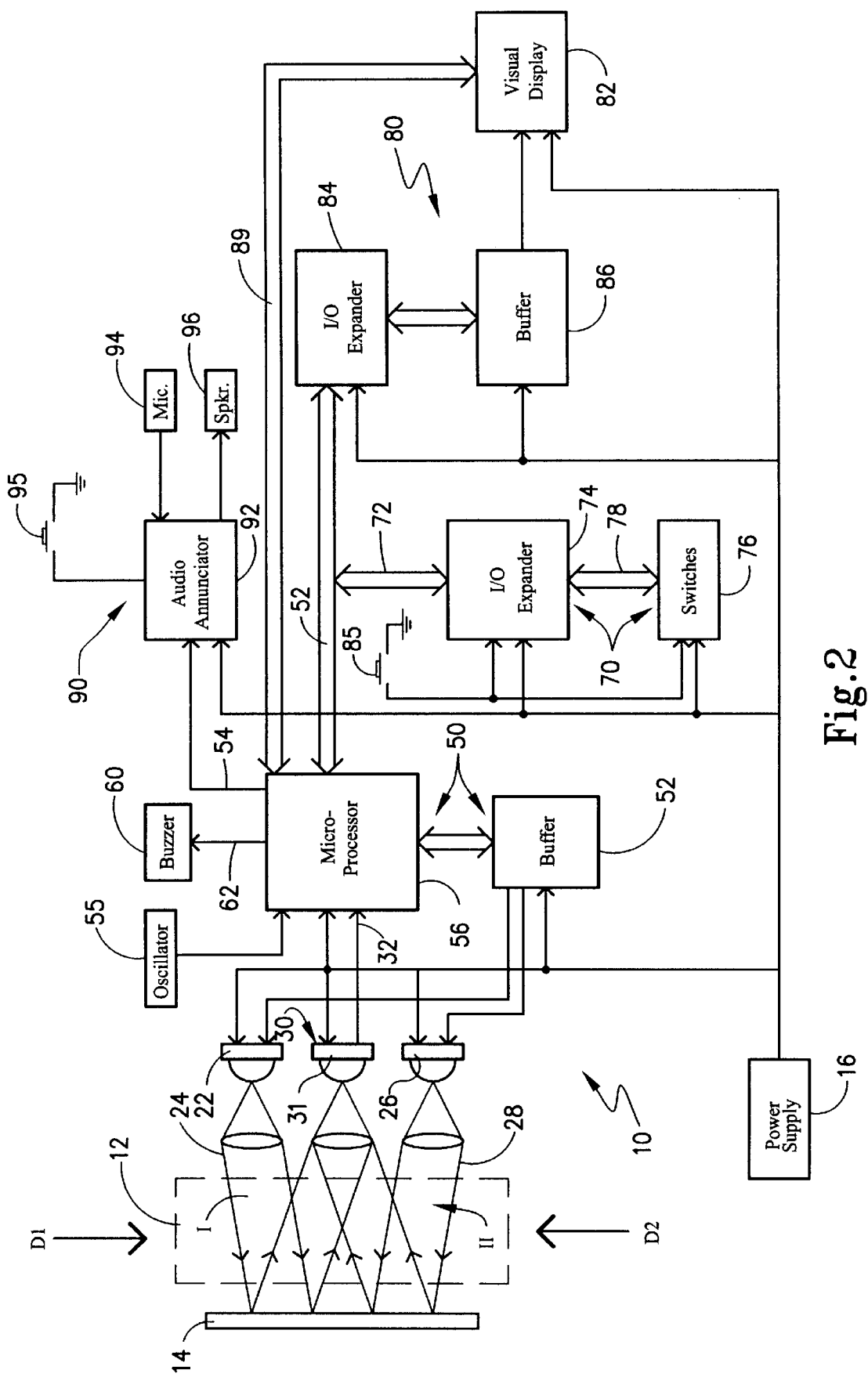
FIG. 2 is a schematic flow chart illustrating the more detailed structure of the motion detection system according to the first exemplary embodiment of the present invention.

A more detailed block diagram of the motion detection system 10 according to the first exemplary embodiment of the present invention may now be appreciated with reference to FIG. 2. Each of the first and second transmitters 22 and 26 transmits its broadcast signal across a threshold 12 along a transmission path, so that first transmitter 22 transmits first broadcast signal 24 along first transmission path "I", while second transmitter 26 transmits second broadcast signal 28 along a second transmission path "II". It should be appreciated that threshold 12 in FIG. 2 illustrates a region through which an object will pass either in a first direction illustrated by arrow "D1" or a second direction illustrated by arrow "D2" so that motion detection system 10 detects directional movement of the object through threshold 12. In this first exemplary embodiment, transmitters 22 and 26 and receiver circuitry 30 are located on one side of threshold 12 and a reflector element 14 is positioned on an opposite side of threshold 12. Receiver circuitry 30 includes a receiver 31 interposed between first and second transmitters 22 and 26 so that it is positioned to receive the first and second broadcast signals 24 and 28 as they are reflected off of reflector element 14.

Preferably, each of the first and second transmitters 22 and 26 produces a pulsating broadcast signal at a selected broadcast signal amplitude, such as five (5) volts, and broadcast signal frequency within the infra-red range. These broadcast signals 24 and 28 are 180° out of phase with respect to one another so that receiver circuitry 30 generates receiver circuitry output 32 to processing circuitry 50 which is a composite of first broadcast signal 24 and second broadcast signal 28, as will be discussed more thoroughly below with reference to FIGS. 6(a)–6(c).

Microprocessor 56, which may be a PIC16C71X chip available from Microchip Technology, Inc. of Chandler, Ariz., receives instructions to control the status of the various inputs and outputs of motion detection system 10. Microprocessor 56, in part, controls the on/off states of first and second transmitters 22 and 26 through a buffer 52 which is essentially a transistor driver, such as the ULN2003 chip available from National Semiconductor Corporation of Arlington, Tex. Together, microprocessor 56 and buffer 52 form processing circuitry 50.

Also in communication with microprocessor 56 via a serial bus 72 is the switching circuitry 70 which includes an I/O expander 74 and a plurality of switches 76. The positions of these respective switches dictate the various input and output parameters for motion detection system 10, namely which of directions "D1" or "D2" corresponds to the "In" direction through the threshold and which of the various output circuits will be activated upon detection of such an event. Switches 76 communicate their settings to I/O expander 74 via communication lines 78, and I/O expander 74 communicates these respective settings to microprocessor 56 via serial bus 72. To this end, I/O expander 74 may be a PCF8674 integrated circuit chip available from Philips Semiconductors of Sunnyvale, Calif.

Microprocessor 56 operates in conjunction with its oscillator 55 to generate the on/off pulsating patterns for first broadcast signal 24 and second broadcast signal 28, thereby to intermediately turn on and off the infra-red light sources produced by first and second transmitters 22 and 26, respectively. Since the first and second broadcast signals 24 and 28 are 180° out of phase with one another, only one light source is on at a given period of time. Preferably, the on-off pulsating patterns for first and second broadcast signals 24 and 28 each consists of a 40 Khz carrier frequency carrying a multiplexing pattern. Modulating the first and second broadcast signals in this manner accomplishes two things. First, the 40 Khz carrier frequency distinguishes the light sources from other infra-red sources, such as direct sunlight. Second, this modulation effectively turns first transmitter 22 on when second transmitter 26 is off, and vise versa, allowing detection of both light sources from the single receiver 31. Receiver 31 is adapted to receive only light signals at 40 Khz, thereby producing a simple digital signal output 32 that is on when infra-red light is present and off when infra-red light is absent. While the motion detection system of the present invention is described herein as having only a single receiver 31, it should be readily appreciated by the ordinarily skilled artisan that receiver circuitry 30 could include a separate receiver for each transmitter, and appropriate comparator circuitry to generate the receiver circuitry output 32.

Microprocessor 56 operates to monitor receiver circuitry 30, and specifically it's output 32, to compare it to the first and second broadcast signals 24 and 28. Microprocessor 56 is thereby able to ascertain any interruption by an object within a selected period of time of both the first and second broadcast signals 24 and 28. Based on the sequence of these interruptions, if any, microprocessor 56 generates a plurality of event detection signals, such as signals 52 and 54, corresponding to movement of the object through threshold 12 in either direction "D1" or direction "D2". Thus, microprocessor 56 is able to ascertain, for example, whether a person has entered or exited a region.

Depending upon the settings of switches 76, one or more output circuits may be activated upon movement through threshold 12. For example, a video output circuit 80 may include a visual display 82 which visually indicates each occurrence of movement through threshold 12 in at least one of the first and second movement directions. Also included in video output circuitry 80 may be another PCF8574 I/O expander 84 and ULN2003 buffer 86 so that visual display 82 can numerically indicate accumulated occurrences of movement through threshold 12. To this end, microprocessor 56 generates a first event detection signal to I/O expander 84 along a serial 12c bus 52 which then outputs it's information to visual display 82 through buffer 86. Visual display 82 is preferably in the form of a 4-digit display, each digit of which is either activated or inactivated by microprocessor 56 via data bus 88. Visual display 82 may be selectively cleared upon actuation of a counter reset push button switch 85.

Alternatively, and as also shown in FIG. 2, audible output indicative of each occurrence of movement through threshold 12 in either or both of the first and second movement directions may be provided through an audio circuit 90 which includes an audio annunciator 92, a microphone element 94 and speaker element 96. Audio annunciator 92, which may be an ISD111OP chip available from ISD Corporation of San Jose, Calif., operates in conjunction with a selectively actuable record switch 95 to store voice messages received by microphone element 94 into memory and transmit these pre-recorded messages through speaker element 96 when it receives a second event detection signal 54 from microprocessor 56. Another representative audio output may be provided by a buzzer 60 which is activated upon receipt of a third event detection signal 62 from microprocessor 56. Of course, it is well within purview of the present invention that a variety of audio and/or video output devices may be provided for use with motion detection system 10 so that the present invention is not unnecessarily confined to those specifically discussed herein.

Finally, as also shown in FIG. 2, power to transmitters 22 and 26, receiver circuitry 30, processing circuitry 50, switching circuitry 70, video output device 80 and audio output device 90 is provided through an appropriate power supply 16.

Figure 3:
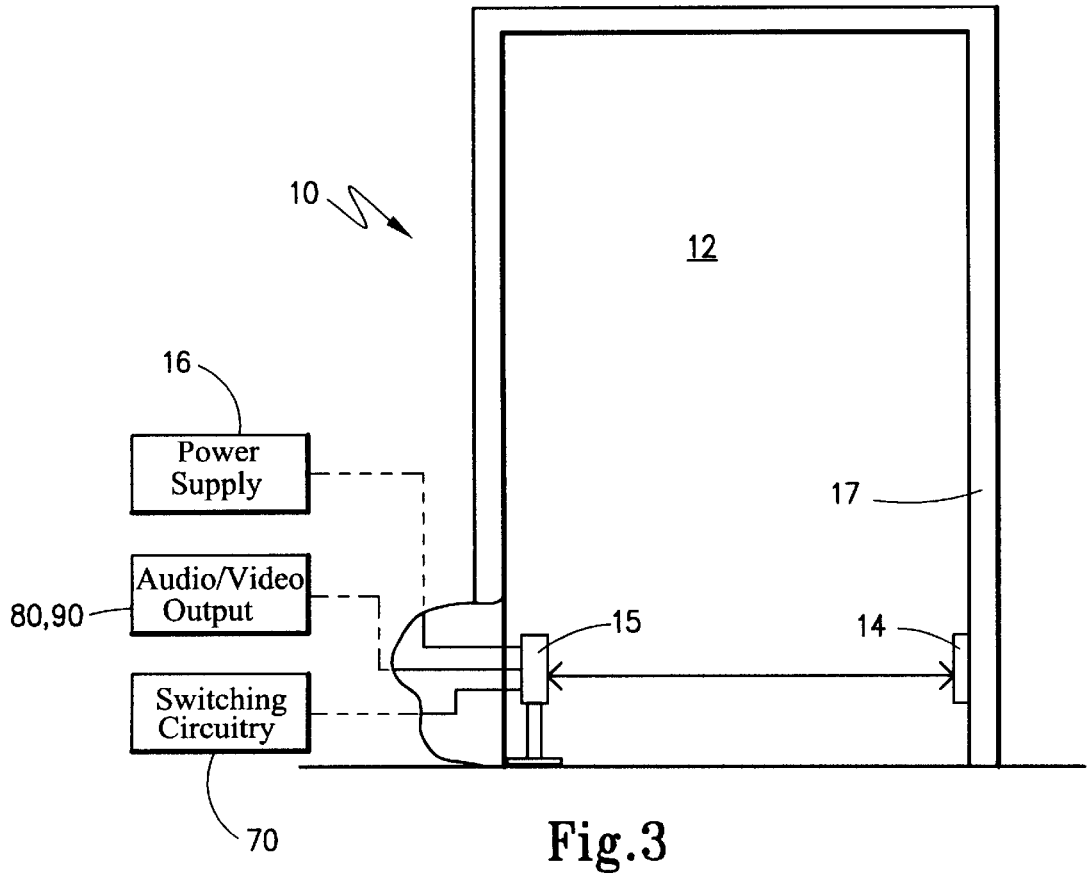
FIG. 3 illustrates a representative application for the motion detection system according to the present invention, and particularly showing the motion detection system situated in the proximity of an entryway.

With an understanding of the general construction for implementing the motion detection system 10 of the present invention, a representative application for the motion detection system may now be appreciated with reference to FIG. 3. FIG. 3 illustrates the use of motion detection system 10 in an entryway 12 which defines the threshold. A housing 15 is preferably provided which contains many of the circuitry components of motion detection system 10, including the transmitters/receiver and the various integrated circuit devices discussed herein. Located across entryway 12 opposite, of housing 15 is a conventional reflector element 14 which may be mounted on doorframe 17 to reflect the first and second broadcast signals back toward the housing's internal receiver circuitry. Located remotely from housing 15 is power supply 16 and switching circuitry 70 which controls the activation states of the remote audio/video output(s) 80, 90, all as discussed herein.

Figure 4A:
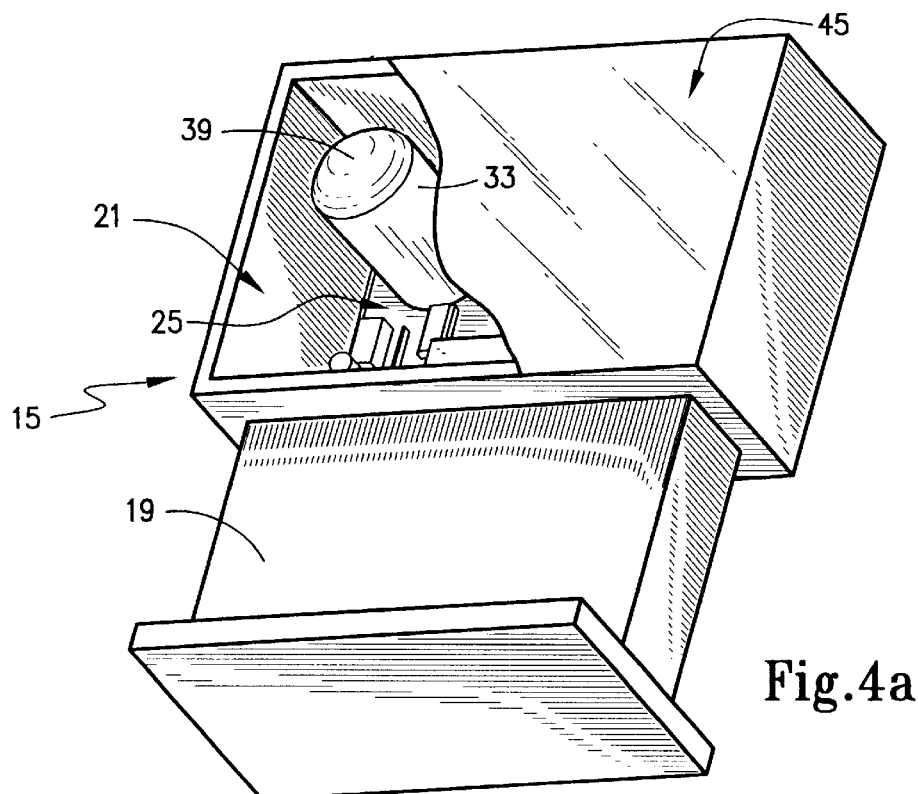
FIG. 4(a) is a perspective view, partially broken away, of a representative enclosure for housing a portion of the motion detection system shown in FIG. 3.
Figure 4B:
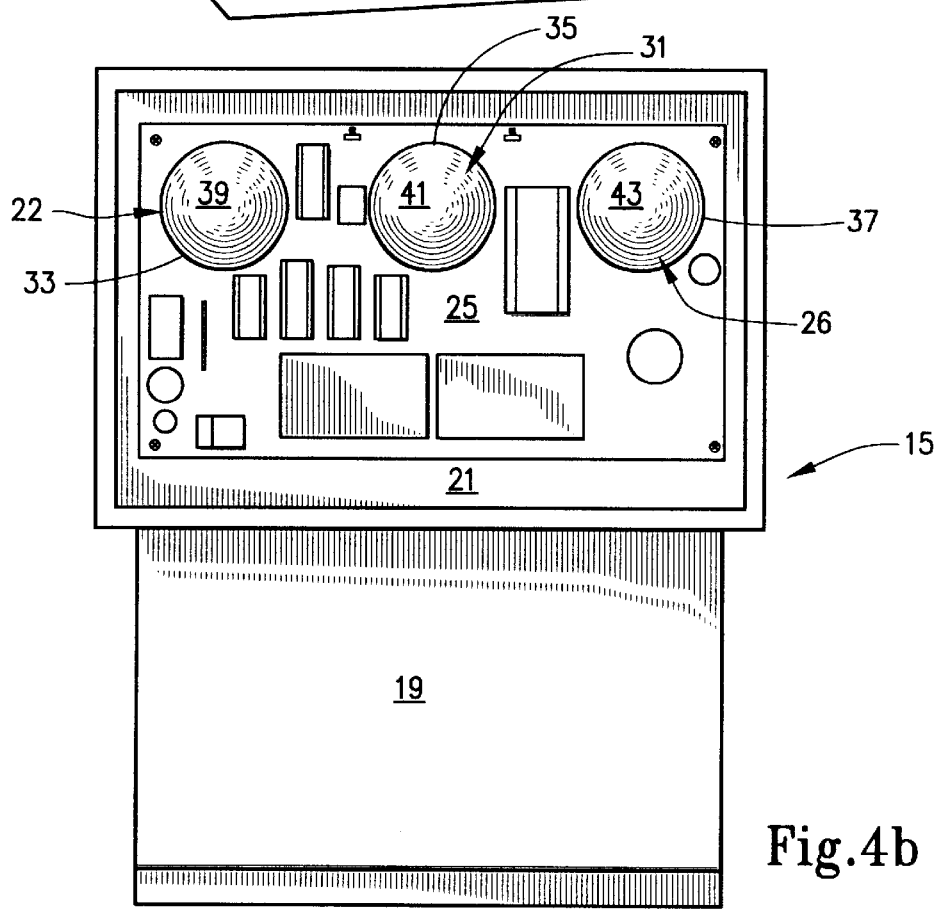
FIG. 4(b) is a front view in elevation of the housing shown in FIGS. 3 and 4(a), with the housing's transmission window removed to reveal the motion detection system's printed circuit board.

The representative construction for housing 15 may best be appreciated with reference to FIGS. 4(a) and 4(b). Housing 15 is supported by a stand 19 and includes an interior region 21 for containing a printed circuit board 25 which has many of the various components comprising motion detection system 10, including first and second transmitters 22, 26 and receiver 31 which is interposed therebetween. Appropriate focusing tubes 33, 35 and 37 and optical elements 39, 41 and 43 are provided to appropriately direct the first and second broadcast signals along their respective transmission paths, and a transmission window substantially conceals printed circuit board 25 while permitting the transmission of light beams therethrough.

Accordingly, a complete circuit diagram of the circuitry similarly diagrammed in FIGS. 1 and 2 is shown in FIGS. 5(a)–5(d). With initial reference then to FIG. 5(a), the transmitter/receiver portion, processing circuitry and switching circuitry are shown. First transmitter 22 is an infra-red light emitting diode which is connected to output pin 16 of buffer 52 via a current limiting resistor 100. Corresponding input pin 1 of buffer 52 is connected to pin 17 of microprocessor 56. Similarly, second transmitter 26 is also an infra-red light emitted diode interconnected to output pin 15 of buffer 52 via current limiting resistor 102. Corresponding input pin 2 of buffer 52 is connected to pin 18 of microprocessor 56. Receiver circuitry 30 includes a receiver 31, resistor 104 and capacitor 106. Receiver 31 may be a GP1US2X infra-red receiving module available from the Sharp Corporation of Osaka, Japan. Resistor 104 and capacitor 106 are connected to the 5V power supply "VCC" in such a manner as to provide filtered power to receiver 31. Resistor 104 is connected between VCC and pin 2 of receiver 31. Capacitor 106 is interconnected between pins 2 and 3 of receiver 31. Output pin 1 of receiver 31 is directly connected to input pin 1 of microprocessor 56. Microprocessor 56 is supported by a crystal oscillator 108 which, in conjunction capacitors 110 and 112, provides the oscillator circuit 55 for microprocessor 56 with a reference frequency of 4 Mhz. Crystal 108 has its terminals interconnected between pins 15 and 16 of microprocessor 56. Capacitor 110 is interconnected between pin 16 of microprocessor 56 and ground, while capacitor 112 is interconnected between pin 15 of microprocessor 56 and ground.

Figure 6A:
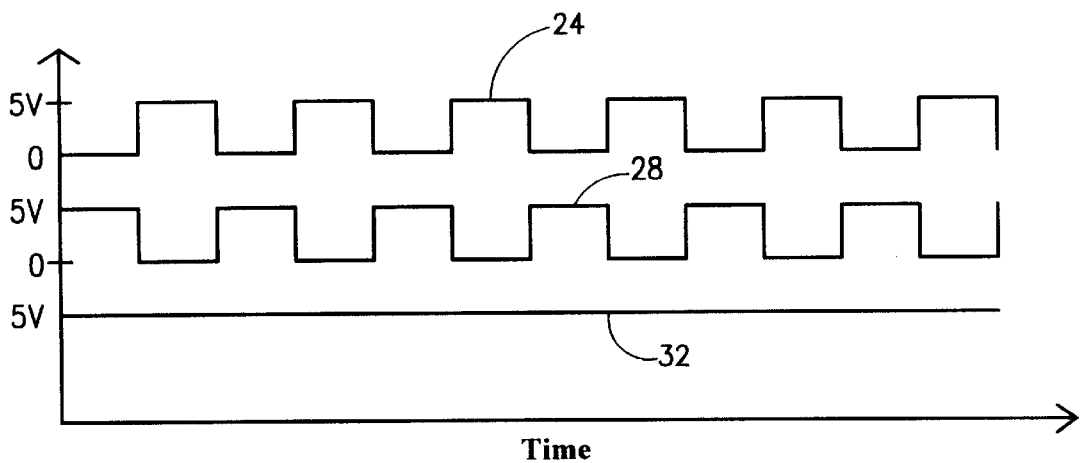
FIG. 6(a) shows representative signals generated by the transmitters and the receiver system which correspond to an absence of movement of an object through a threshold.
Figure 6B:
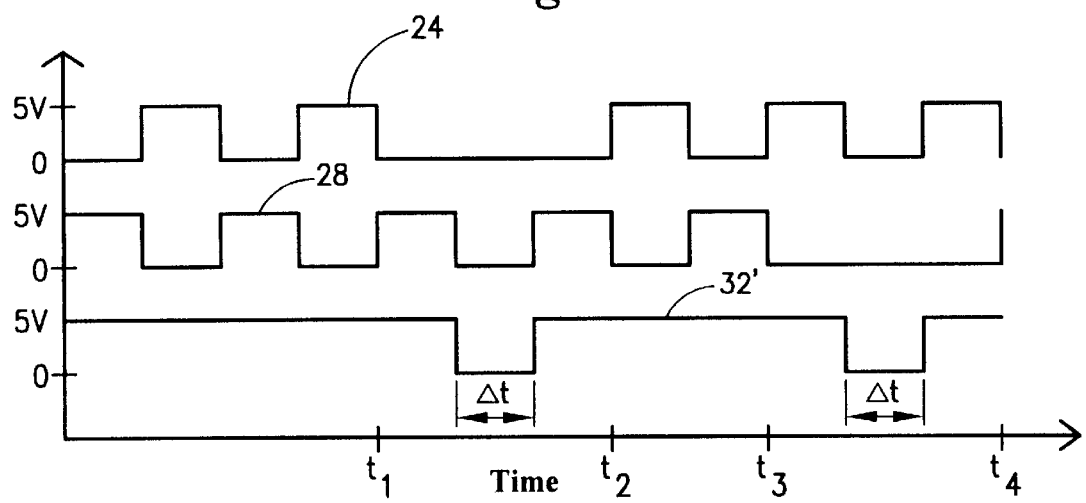
FIG. 6(b) shows representative signals generated by the transmitters and the receiver system which correspond to movement of an object through the threshold in a first movement direction.
Figure 6C:
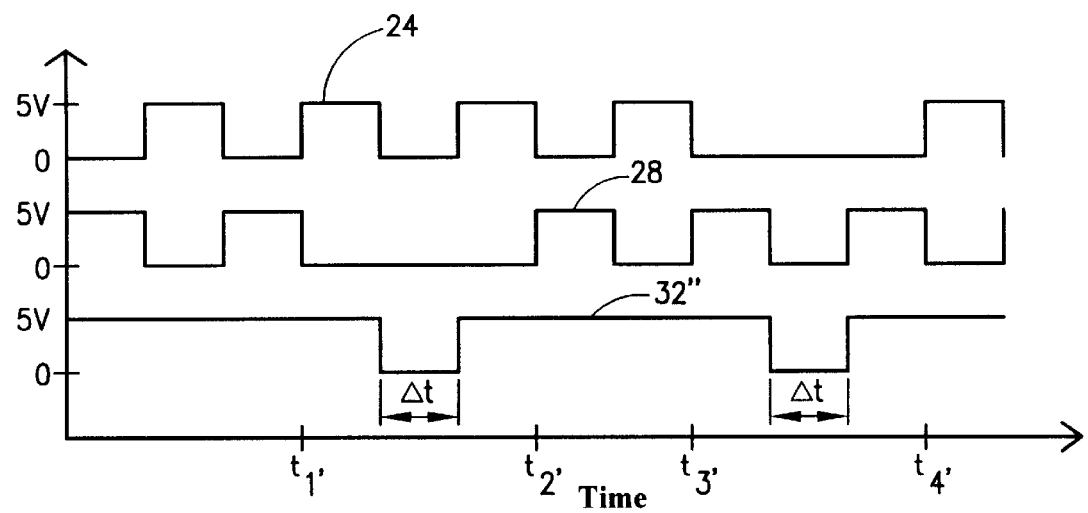
FIG. 6(c) shows representative signals generated by the transmitters and the receiver system which correspond to movement of an object through the threshold in a second movement direction.

Each of the first and second broadcast signals 24 and 28 consists of a 40 Khz carrier frequency carrying a multiplexing pattern as shown in FIGS. 6(a)–6(c). The output of receiver circuitry 30 is a composite of first and second broadcast signals 24 and 26 so that, in the absence of movement of an object through the threshold, receiver circuitry 30 generates a receiver circuitry reference signal 32 having a constant amplitude over a selected period of time, as represented in FIG. 6(a). However, upon interruption of one or both of the first and second broadcast signals by the object within a selected period of time, receiver circuitry 30 generates a receiver circuitry interrupted output corresponding to movement of the object, respectively, through the first and second transmission paths. "I" and "II" shown in FIG. 2. The characteristics of the receiver circuitry interrupted output over the selected period of time informs microprocessor 56 of the sequence of interruption of the first and second broadcast signals 24 and 28.

To illustrate, FIG. 6(b) depicts the situation where an object moves across the threshold in direction "D2" whereby first broadcast signal 24 is initially interrupted, followed by interruption of second broadcast signal 28. That is, between times "$t_1$" and "$t_2$" first broadcast signal 24 is blocked by the object and, therefore, does not pass across the threshold to be detected by receiver 31. For a brief period of time "Δt" corresponding to an interval during which only transmitter 22 is generating a pulse, no broadcast signals are received by receiver 31 and, therefore, it's output drops to zero. Thereafter, the object proceeds through the threshold region and blocks second broadcast signal 28 between times "$t_3$" and "$t_4$". Again, for a brief interval of time "Δt" corresponding to when only second transmitter 28 is transmitting a broadcast signal, the output of receiver circuitry 31 drops to zero. As such, it should be appreciated that between times "$t_3$" and "$t_4$" receiver circuitry 30 generates a receiver circuitry interrupted output 32' which can be analyzed by processing circuitry 50, and specifically microprocessor 56, to determine the particular sequence of interruption of first and second broadcast signal 24 and 28, thereby corresponding to movement of the object through the threshold in the first movement direction "D1".

The converse of this situation is now shown in FIG. 6(c) which depicts what occurs upon movement of the object through the threshold in the second movement direction "D2". In this situation second broadcast signal 28 is initially blocked times "$t_1'$" and "$t_2'$", resulting from the object crossing second transmission path "II", followed by blockage of first broadcast signal 24 between times "$t_3'$" and "$t_4'$" resulting from passage of the object through first transmission path "I". Again, for an interval of time "Δt'" between times "$t_1'$" and "$t_2'$" the output of receiver circuitry 30 drops to zero followed by another interval of time "Δt" between times "$t_3'$" and "$t_4'$" during which it again drops to zero. Receiver circuitry 30, therefore, generates a different receiver circuitry interrupted output 32" between times "$t_1'$" and "$t_4'$", the characteristics of which are compared by processing circuitry 50 to the first and second broadcast beams 24 and 28 to determine that the object has moved in the second direction through the threshold.

Referring back to FIG. 5(a), the characteristics of switching circuitry 70 will determine whether or not microprocessor 56 will generate one or more event detection signals in response to movement of the object through threshold in one of the first and second movement directions. To this end, switches 76 include a plurality of switch elements 115–120 which are each operative in a first and second switch mode to control these parameters. Each of switches 115–120 is interconnected to VCC, respectively, via pull up resistors 125–130 which form part of a resistor bank 124. Switch elements 115–120 are also connected, respectively, between pins 9–11 and 5–8 of 110 expander 74 and ground. As far as the remaining pins of I/O expander 74, pins 1–3 and 8 thereof are tied to ground, while pins 12 and 13 are not used. Pin 16 of I/O expander 74 is tied directly to VCC and to ground via capacitor 134. Pin 4 is connected to ground via the visual display reset switch 85. Pin 4 is also tied to VCC via pull up resistor 131. Finally, pins 14 and 15 of I/O expander 74 are, respectively, tied to VCC via pull up resistors 133 and 132, and to pins 8 and 7 of microprocessor 56.

Switches 115–120 are set in either an "open" mode or "closed" mode so that when dip switch 115 is closed, direction "D2" in FIG. 2 is designated by microprocessor 56 as the "In" direction, and when switch 115 is in the open position, direction "D1" in FIG. 2 is understood by microprocessor 56 to be the "In" direction. When switch 116 is open, audible sound may be transmitted when the object passes through the threshold in the designated "In" direction, whereas when switch 116 is closed, no audible sound is transmitted in response to movement of an object through the threshold in the designated "In" direction. Similarly, when switch 117 is open audible sound may be transmitted in response to movement of an object through the threshold in the designated "Out" direction, while no audible sound is transmitted in response to movement in the "Out" direction when switch 117 is closed. Switch 118 controls the transmission of pre-recorded voice messages out of audio circuit 90 so that when switch 118 is open, audio circuit 90 is inactivated resulting in only an audible beep from beeper 60 in response to movement of the object through the threshold in both directions. However, when switch 118 is closed, audio circuit 90 is caused to transmit the pre-recorded voice message in response to movement of the object through the threshold in either direction. Switch 119 can be selectively toggled so that the pre-recorded voice message is only transmitted in response to movement in either the "In" or "Out" direction. That is, when switch 119 is open, the pre-recorded voice message is transmitted in response to movement of the object through the threshold in the "In" direction, whereas when switch 119 is closed the pre-recorded voice message is only transmitted upon movement of the object through the threshold in the designated "Out" direction. Switch 120 is an unused switch element but may be employed to control activation of an additional output circuit, as desired.

Figure 5A:
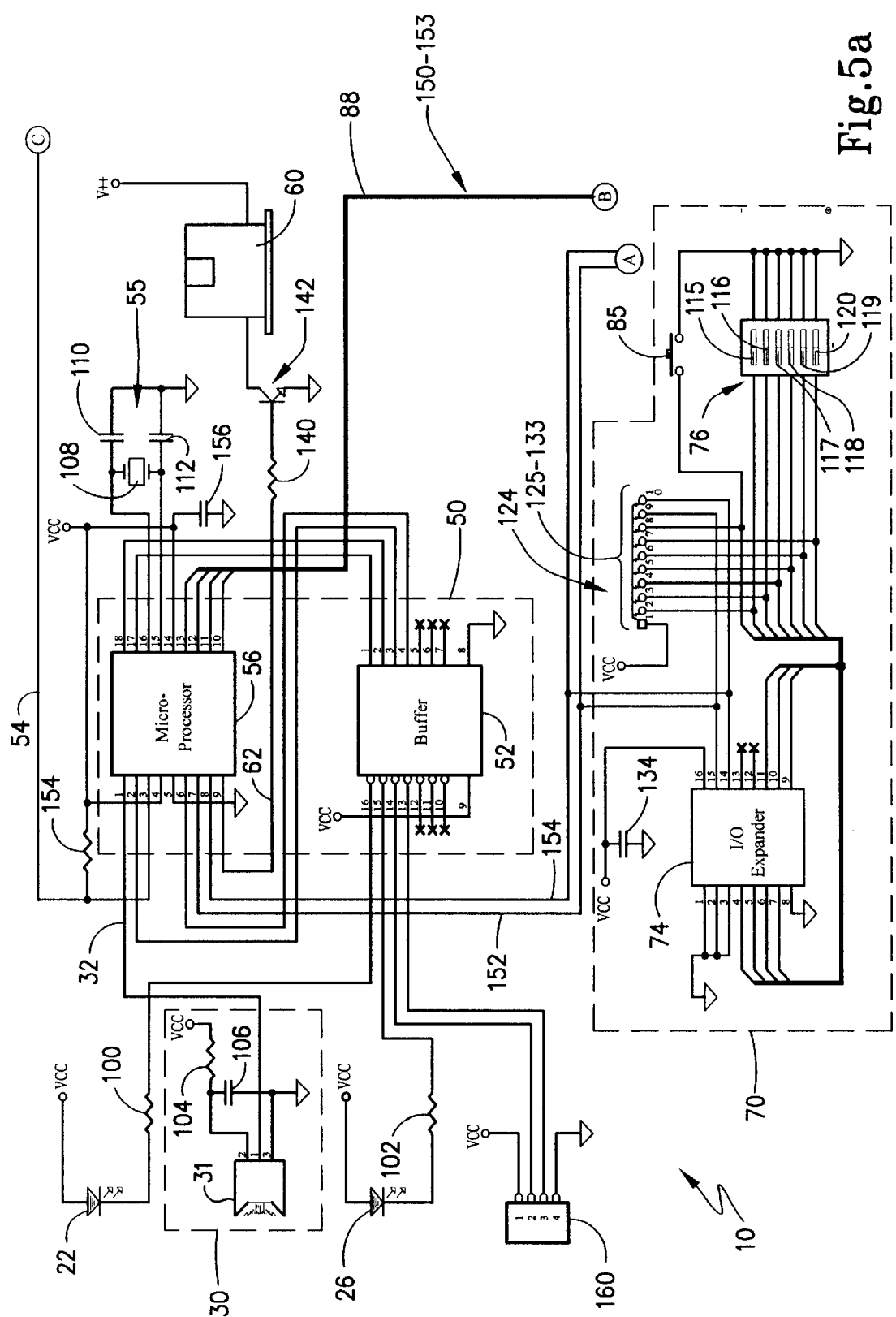

Referring now to beeper 60 in FIG. 5(a), it is connected to output pin 9 of microprocessor 56 via resistor 140 and an appropriate npn transistor 142 such as a 2N3904. Thus, microprocessor 56 is operative to transmit the third event detection signal 62 to beeper 60, as dictated by the appropriate settings of switches 76. Also depending upon the settings of these switches 76, second event detection signal 54 may be presented to audio circuit 90 via pin 3 of microprocessor 56. Control signals may also be presented to the video output circuitry 80 via data bus 88 which includes communication lines 150–153 which are respectively connected to pins 10–13 of microprocessor 56. As for the remaining pins of microprocessor 56, pin 3 of microprocessor 56 is an open collector output pulled up to VCC via resistor 154 and connected to pin 24 of audio annunciator 92 in FIG. 5(c). Pin 5 of microprocessor 56 is tied directly to ground and pin 14 thereof is tied directly to VCC and is filtered via filtering capacitor 156. Finally, pins 2 and 6 of microprocessor 56 are, respectively, connected to pins 3 and 4 of buffer 52 which have their corresponding output pins 14 and 13 tied, respectively, to pins 2 and 4 of a connector 160 which may be used to provide additional relay capabilities, as desired.

Figure 5B:
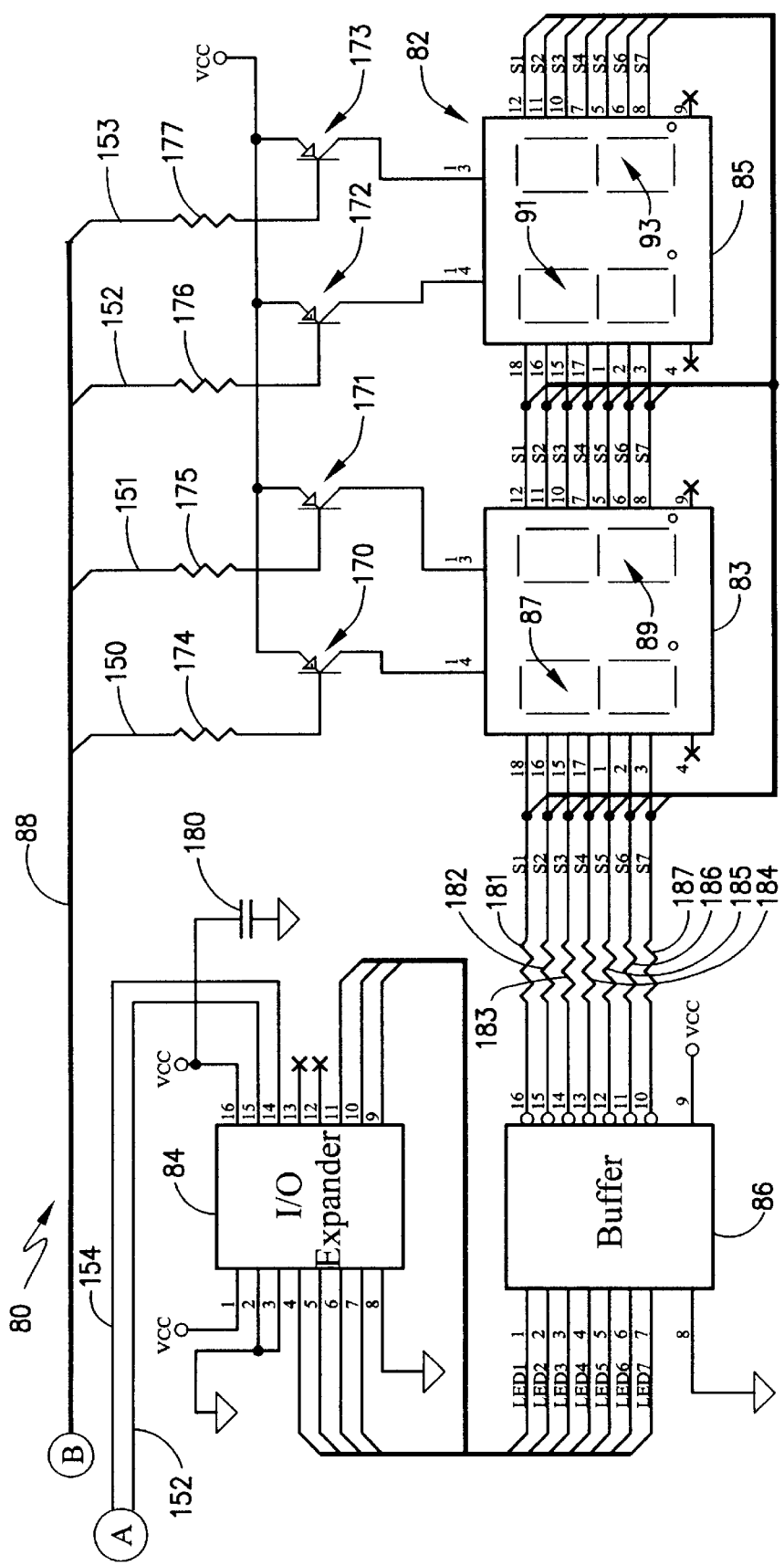
Figure 5C:
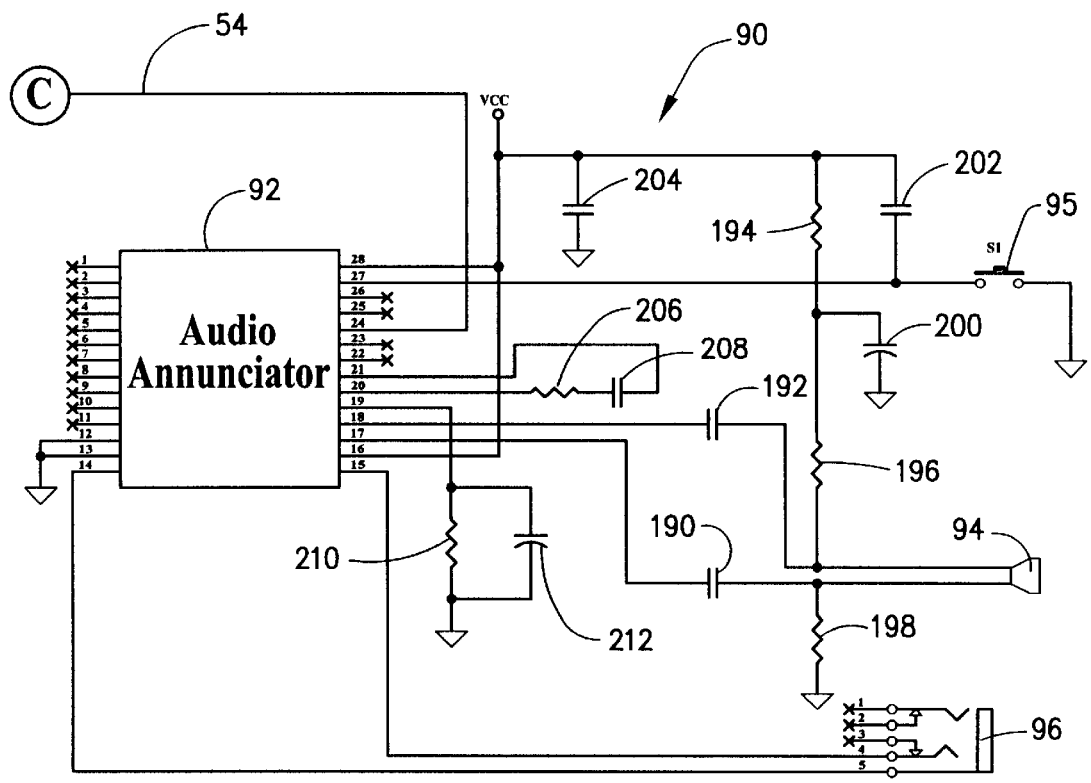

Referring now to FIG. 5(b), video output circuitry 80 is shown which includes the 4 digit LED display 82, I/O expander 84 and buffer 86. Visual display 82 consists of two, 2-digit LED displays 83 and 85, each of which incorporates standard seven segment numeric displays 87, 89 and 91, 93, respectively. Each of LED displays 83 and 85 may be an LN524GA display available from Panasonic Corporation of Kadoma City, Osaka, Japan, or other appropriate device. PNP transistors 170–173 respectively control the seven segment numeric displays 87, 89, 91 and 93 to provide the source current for each digits anode. Transistors 170–173 are respectively connected to pins 10–13 of microprocessor 56 in FIG. 5(a) via resistors 174–177, thereby to define the data bus 88 and its communication lines 150–153.

I/O expander 84 operates in conjunction with buffer 86 to drive the cathode segments of each digit 87, 89, 91 and 93. To this end, pins 4–7 and 9–11 of I/O expander 84 are, respectively, connected to input pins 1–7 of buffer 86. As also shown, pins 1 and 16 of I/O expander 84 are connected directly to VCC with pin 16 additionally connected to ground via capacitor 180. Pins 2, 3 and 8 of I/O expander 84 are tied directly to ground, while pins 12 and 13 thereof are unused. As for buffer 86, pins 8 and 9 thereof are, respectively, connected to ground and VCC, while pins 10–16 are, respectively, connected to appropriate cathode inputs of LED displays 83 and 85 via current limiting resistors 181–187, as shown.

With reference now to both FIGS. 5(a) and 5(b), microprocessor 56 sends event detection signals in the form of serialized data to I/O expander 84 along serial bus 52. This serialized information includes serial data transmitted along line 152 which interconnects pin 7 of microprocessor 56 to pin 15 of I/O expander 84. This serialized information also includes serial clock data along line 154 which interconnects pin 8 of microprocessor 56 to pin 14 of I/O expander 84.

By sending I/O expander 84 serial Information via data lines 152 and 154, I/O expander may be commanded to drive any combination of its eight output pins to a logic "High" or "Low" level. Seven of these pins, as discussed above, are used to drive the LED displays 83 and 85. The internal transistor buffers associated with buffer 86 are capable of handling the current needed to drive the LED display digits 87, 89, 91 and 93.

The 4-digit display 82 is multiplexed, so that each digit is sequentially turned on at a rapid rate via one of the four transistor 170–173. The specific digit to be displayed has its segments turned on or off during that time via signals output from I/O expander 84 and buffered through buffer 86. Resistors 181–187 serve to limit current to each LED segment when turned on.

Microprocessor 56 controls the LED displays 83 and 85 by determining and then controlling what will be displayed on each digit. This capability allows visual display 82 to numerically indicate accumulated occurrences of movement through the threshold in at least one of the first and second movement directions, as dictated by the settings of switches 76. For example, upon a first occurrence of movement through the threshold in a selected direction, transistor 170 is turned on, resulting in the number "1" being displayed. Thereafter, microprocessor 56 instructs I/O expander 84 via a serial 12c command to turn on the necessary segments to display the digit "1". After a quarter of the multiplexing period has expired, transistor 170 is turned off and transistor 171 is turned on. Upon the next occurrence of movement of the object through the threshold, microprocessor 56 commands I/O expander 84 via a serial 12c command to turn on the necessary segments required to display the digit "2". This is repeated for the remaining transistors 172 and 173 for each quarter cycle of the multiplexing period, and the entire process is thereafter repeated. The desired segments for each digit are the outputs of a simple four-digit up-counter within microprocessor 56. This counter counts up by an increment of one each time an "In" passage is detected, as determined by the deterministic logic discussed below with respect to switches 76. This internal counter may be selectively reset by counter reset switch 85 shown in FIG. 5(a).

Figure 5D:
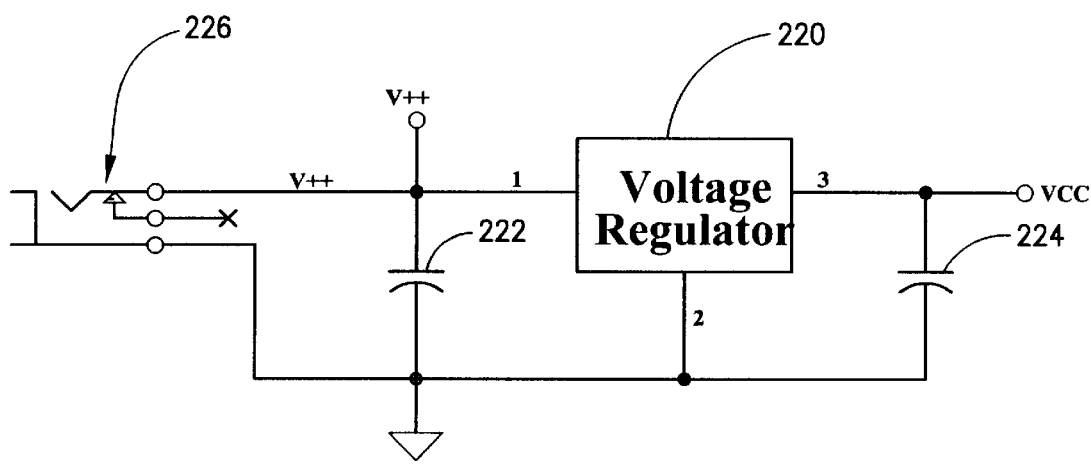

The audio output circuit 90 may now be best appreciated with reference to FIG. 5(d). Audio annunciator 92 is the heart of this sub-circuit. Again, audio annunciator 92 is preferably an ISD1110P available from ISD Corporation of San Jose, Calif. Audio annunciator 92 allows a user to record a ten second message and play it back on demand. It records audio by sampling the audio into an analog memory array, which remembers the sampled voltage levels captured during each audio sample period. As such, annunciator 92 is a self-contained audio recording and play back circuit having only peripheral control and support circuitry.

External microphone element 94 is, respectively, connected to pins 17 and 18 of audio annunciator 92 via capacitors 190 and 192. Microphone element 94 is also interposed between VCC and ground via resistors 194, 196 and 198. Interconnected between resistors 194, 196 and ground is a capacitor 200. Record switch 95 is connected directly to pin 27 of audio annuciator 92 and to VCC via a filtering capacitor 202. Pin 28 of audio annunciator 92 is connected directly to VCC and to ground through capacitor 204. External filtering components, comprising resistor 206 and capacitor 208, interconnect pins 20 and 21 of audio annunciator 92. Pins 12 and 13 of audio annunciator 92 are tied directly to ground, as is pin 19 via external filtering components consisting of resistor 210 and capacitor 212. Finally, speaker element 96 is connected between pins 14 and 15 of audio annunciator 92.

Upon actuation of record switch 95 into the closed position, pin 27 of audio annunciator 92 is forced low and audio annunciator 92 begins to record into it's internal memory audio presented at microphone element 94. This continues until either the memory is full (i.e. ten seconds) or the signal at pin 27 is allowed high by opening record switch 95. Once audio is in memory, a logic low event detection signal 54 applied to pin 24 of audio annunciator 92 from pin 3 of microprocessor 56 causes the pre-recorded message stored in memory to be output to external speaker element 96. As discussed above, the existence of an event detection signal 54 from microprocessor 56 is dictated by the respective settings of the necessary logic switches 76.

Power for the motion detection circuitry described above is provided by means of a voltage regulator 220 shown in FIG. 3(d). Voltage regulator 220 is preferably a 7805, 5 volt regulator chip available from National Semiconductor Corporation of Arlington, Tex. Low voltage, unregulated DC power generated from a standard AC to low voltage DC power supply is applied via power connector 226. This unregulated DC voltage is filtered by capacitor 222 and applied to pin 1 of chip 220. Pin 2 of chip 220 is the ground connection, and pin 3 of chip 220 is the 5 volt regulated output VCC filtered by capacitor 224.

With the above described circuitry in mind, a component chart including selected values is set forth in the following table:

TABLE 1

| Resistors | | Capacitors | |
|---|---|---|---|
| Element # | Value (in ohms) | Element # | Value (in fareds) |
| 100 | 150 | 106 | 10 µF |
| 102 | 150 | 110 | 15 pF |
| 104 | 27 | 112 | 15 pF |
| 125 | 10 k | 134 | 0.1 µF |
| 126 | 10 k | 156 | 0.1 µF |
| 127 | 10 k | 180 | 0.1 µF |
| 128 | 10 k | 190 | 0.1 µF |
| 129 | 10 k | 192 | 0.1 µF |
| 130 | 10 k | 200 | 220 µF |
| 131 | 10 k | 202 | 0.1 µF |
| 132 | 10 k | 204 | 0.1 µF |
| 133 | 10 k | 208 | 0.1 µF |
| 140 | 10 k | 212 | 4.7 µF |
| 154 | 10 k | 222 | 1000 µF |
| 174 | 10 k | 224 | 10 µF |
| 175 | 10 k | | |
| 176 | 10 k | | |
| 177 | 10 k | | |
| 181 | 47 | | |
| 182 | 47 | | |
| 183 | 47 | | |
| 184 | 47 | | |
| 185 | 47 | | |
| 186 | 47 | | |
| 187 | 47 | | |
| 194 | 1 k | | |
| 196 | 10 k | | |
| 198 | 10 k | | |
| 206 | 5.1 k | | |
| 210 | 470 k | | |

Figure 7:
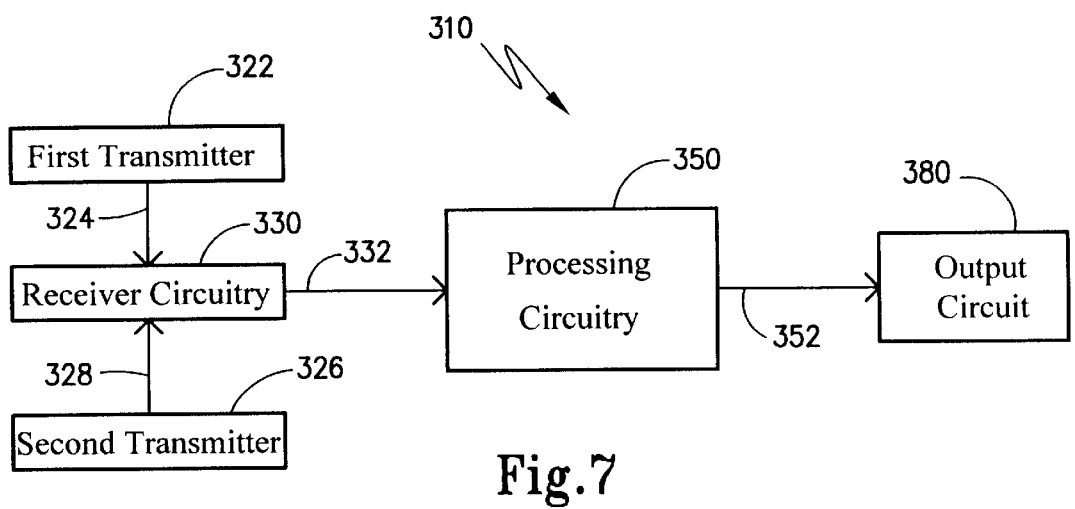
FIG. 7 is a block diagram showing, in simplified form, the general structure of the motion detection system according to the second exemplary embodiment of the present invention.

A second exemplary embodiment of the motion detection system of the present invention may now be appreciated with reference to FIG. 7. In this second exemplary embodiment, motion detection system 310 is simplified in comparison to motion detection system 10 discussed above in that it does not incorporate the switching circuitry or a plurality of output circuits. Rather, motion detection system 310 incorporates a first transmitter 322 operative to produce a first broadcast signal 324 along a first transmission path toward receiver circuitry 330 and a second transmitter 326 operative to produce a second broadcast signal 328 along a second transmission path toward receiver circuitry 330. Receiver circuitry 330 operates in an absence of movement of an object through the threshold to receive the first and second broadcast signals and to generate receiver circuitry output 332 to processing circuitry 350. As with the first exemplary embodiment of the present invention, receiver circuitry output 332 either has a reference state corresponding to an absence of movement of the object through the threshold, or an interrupted state corresponding to movement of the object, respectively, through the first and second transmission paths. Processing circuitry 350 monitors receiver circuitry 330 and operates in response to detection of a receiver circuitry interrupted output to produce an event detection signal 352 to an appropriate output circuit 380, which may be either an audio or visual display.

Figure 8:
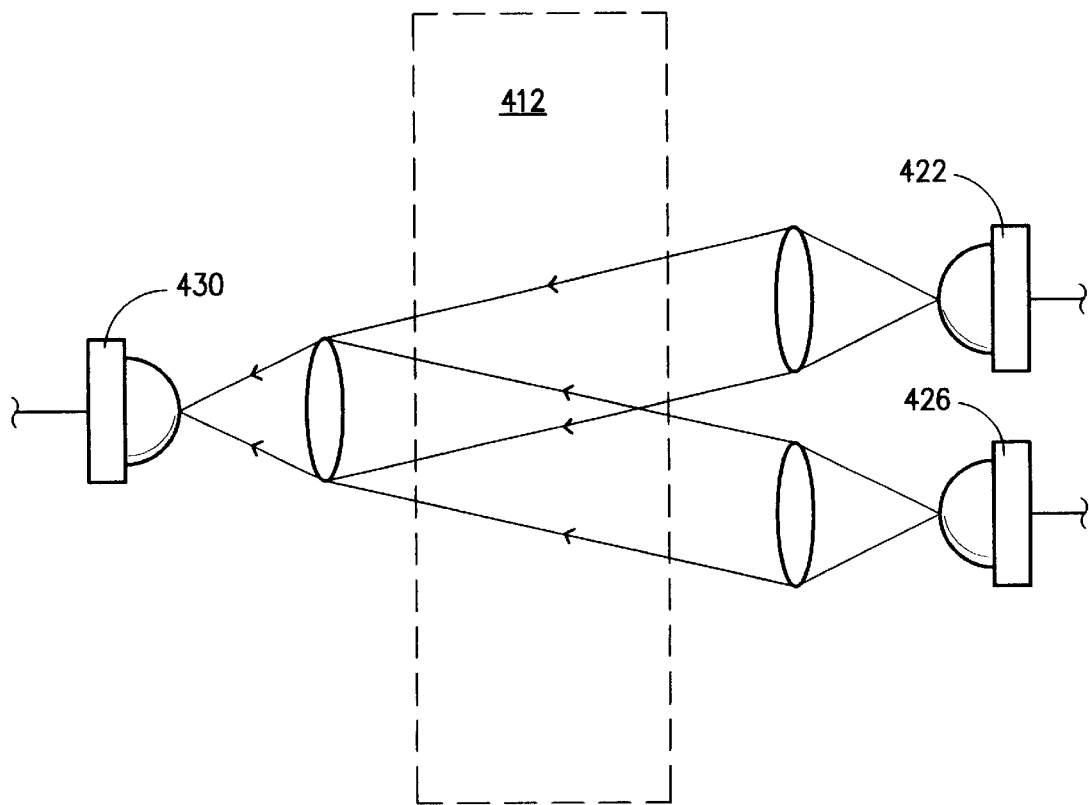
FIG. 8 is a diagrammatic view illustrating an alternative orientation of the transmitters and the receiver circuitry for a motion detection system which does not require a reflector element.

Although the first and second exemplary embodiments of the present invention have described a motion detection system in which the transmitters and the receiver circuitry are located on the same side of the threshold, an alternative arrangement shown in FIG. 8 is contemplated wherein the receiver circuitry 430 is located on an opposite side of threshold 412 from first and second transmitters 422 and 426.

Based on the foregoing, it should be readily appreciated that the present invention also contemplates a methodology of detecting movement of an object through a threshold in a selected movement direction, the processing steps of which can be accomplished by implementing the circuitry described herein. Broadly, this methodology comprises the steps of transmitting first and second broadcast signals across a threshold, respectively, along first and second transmission paths; generating an event detection signal upon sequential interruption of said first and second broadcast signals within a selected period of time resulting form movement of the object through the first and second transmission paths, with the event detection signal corresponding to movement of the object through the threshold in one of the first and second movement directions; and generating a selected output in response to said event detection signal.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiment of the present invention without departing from the inventive concepts contained herein

We claim:

1. A motion detection system adapted for use in detecting movement of an object through a threshold in a selected movement direction, comprising:
   (a) a first transmitter operative to produce a first broadcast signal and to transmit the first broadcast signal across the threshold along a first transmission path;
   (b) a second transmitter operative to produce a second broadcast signal and to transmit the second broadcast signal across the threshold along a second transmission path, said first and second broadcast signals being out of phase with respect to one another;
   (c) receiver circuitry operative in an absence of movement of the object through the threshold to receive the first and second broadcast signals and to generate a receiver circuitry reference signal, and operative upon interruption of both the first and second broadcast signals by the object within a selected period of time to generate a receiver circuitry interrupted output corresponding to movement of the object, respectively, through the first and second transmission paths;
   (d) processing circuitry operative to monitor said receiver circuitry and operative in response to detection of said receiver circuitry interrupted output, corresponding to movement of the object through the threshold in one of a first and second movement direction, to produce an event detection signal; and
   (e) output circuitry operative to receive said event detection signal and to generate a selected output in response thereto, thereby to indicate movement of the object through the threshold in at least one of the first and second movement directions.

2. A motion detection system according to claim 1 wherein said first transmitter is operative to produce a pulsating first broadcast signal at a selected first broadcast signal frequency and first broadcast signal amplitude.

3. A motion detection system according to claim 2 wherein said second transmitter is operative to produce a pulsating second broadcast signal at a selected second broadcast signal frequency and second broadcast signal amplitude.

4. A motion detection system according to claim 3 wherein each said first and second broadcast signal frequency is in the infra-red range.

5. A motion detection system according to claim 4 wherein each said first and second broadcast signal frequency is modulated by a 40 Khz carrier frequency.

6. A motion detection system according to claim 3 wherein said first broadcast signal is 180 degrees out of phase with respect to said second broadcast signal and wherein each of said receiver circuitry reference output and said receiver circuitry interrupted output is a composite of said first and second broadcast signals.

7. A motion detection system according to claim 1 wherein said first broadcast signal is 180 degrees out of phase with respect to said second broadcast signal and wherein each of said receiver circuitry reference output and said receiver circuitry interrupted output is a composite of said first and second broadcast signals.

8. A motion detection system according to claim 1 wherein each of said first and second transmitters is an infra-red light emitting diode, and wherein said receiver circuitry includes an infra-red receiver.

9. A motion detection system according to claim 1 wherein said output circuitry includes a visual display operative to visually indicate each occurrence of movement through the threshold in at least one of the first and second movement directions.

10. A motion detection system according to claim 9 wherein said visual display numerically indicates accumulated occurrences of movement through the threshold in at least one of the first and second movement directions.

11. A motion detection system according to claim 10 wherein said event detection signal contains serial data.

12. A motion detection system according to claim 10 including a reset circuit selectively actuable to clear said visual display.

13. A motion detection system according to claim 1 wherein said output circuitry is in the form of an audio circuit which audibly indicates each occurrence of movement through the threshold in at least one of the first and second movement directions.

14. A motion detection system according to claim 13 wherein said audio circuit is operative to transmit a selected pre-recorded message upon each occurrence of movement through the threshold in at least one of the first and second movement directions.

15. A motion detection system according to claim 14 wherein said audio circuit includes a programmable integrated circuit device and an external speaker element.

16. A motion detection system according to claim 15 wherein said audio circuit includes an external microphone element and a record switch adapted for use with said microphone element, said integrated circuit device operative upon actuation of said record switch to store voice messages received by said microphone element into memory.

17. A motion detection system according to claim 1 wherein said first and second transmitters and said receiver circuitry are contained within a common housing adapted to be positioned on one side of said threshold, and including a reflector element adapted to be positioned on an opposite side of said threshold in an opposed relationship to said housing such that said first and second broadcast signals are reflected by said reflector element toward said receiver circuitry.

18. A motion detection system according to claim 17 wherein said receiver circuitry includes a receiver interposed between said first and second transmitters and operative to receive each of the first and second broadcast signals.

19. A motion detection system according to claim 17 wherein said output circuitry is located remotely of said housing.

20. A motion detection system according to claim 1 including a direction indicator switch operative in a first mode to cause said processing circuitry to produce said event detection signal only upon movement of the object through the threshold in the first movement direction and operative in a second switch mode to cause said processing circuitry to produce said event detection signal only upon movement of the object through the threshold in the second movement direction.

21. A motion detection system adapted for use in detecting movement of an object through a threshold in a selected movement direction, comprising:
(a) a first transmitter operative to produce a first broadcast signal and to transmit the first broadcast signal across the threshold along a first transmission path;
(b) a second transmitter operative to produce a second broadcast signal and to transmit the second broadcast signal across the threshold along a second transmission path that is different from said first transmission path;
(c) receiver circuitry adapted to receive the first and second broadcast signals and operative to generate either a receiver circuitry reference output corresponding to an absence of interruption of said first and second broadcast signals, or a receiver circuitry interrupted output corresponding to a sequential interruption of both said first and second broadcast signals that results from movement of the object, respectively, through the first and second transmission paths;
(d) processing circuitry operative to monitor said receiver circuitry and operative in response to detection of said receiver circuitry interrupted output, corresponding to movement of the object through the threshold in one of a first and second movement direction, to produce a plurality of event detection signals; and
(e) a plurality of output circuits each operative to receive a respective one of said event detection signals and to generate a selected output in response thereto; and
(f) switching circuitry including a plurality of switch elements each having a first switch mode wherein a respective one of said output circuits is activated and a second switch mode wherein a respective one of said output circuits is inactivated.

22. A motion detection system according to claim 21 wherein said plurality of output circuits includes a visual display operative to visually indicate each occurrence of movement across the threshold in at least one of the first and second movement directions and a first audio circuit operative to audibly indicate each occurrence of movement through the threshold in at least one of the first and second movement directions.

23. A motion detection system according to claim 22 wherein a selected one of said event detection signals contains serial data and wherein visual display is operative in response to the selected event detection signal to numerically indicate accumulated occurrences of movement through the threshold in at least one of the first and second movement directions.

24. A motion detection system according to claim 22 wherein said first audio circuit is operative to transmit a selected pre-recorded message upon each occurrence of movement through the threshold in at least one of the first and second movement directions.

25. A motion detection system according to claim 23 wherein said first audio circuit is operative to transmit a selected pre-recorded message upon each occurrence of movement through the threshold in at least one of the first and second movement directions.

26. A motion detection system according to claim 25 including a second audio circuit operative to transmit an audible beep upon each occurrence of movement through the threshold in at least one of the first and second movement directions.

27. A motion detection system according to claim 21 wherein said switching circuitry includes a direction indicator switch operative in a first mode to cause said processing circuitry to produce said event detection signals only upon movement of the object through the threshold in the first movement direction and operative in a second switch mode to cause said processing circuitry to produce said event detection signals only upon movement of the object through the threshold in the second movement direction.

28. A motion detection system according to claim 21 wherein said first transmitter is operative to produce a pulsating first broadcast signal at a selected first broadcast signal frequency and said second transmitter is operative to produce a pulsating second broadcast signal that is 180 degrees out of phase with respect to said first broadcast signal, and wherein each of said receiver circuitry reference output and said receiver circuitry interrupted output is a composite of said first and second broadcast signals.

29. A motion detection system according to claim 21 wherein said receiver circuitry and said processing circuitry are contained within a common housing adapted to be positioned proximately to said threshold, and wherein said output circuits are located remotely of said housing.

30. A motion detection system adapted for use in detecting movement of an object through a threshold in a selected movement direction, comprising:
(a) means for transmitting a first broadcast signal across the threshold along a first transmission path, said first broadcast signal being at a first phase;
(b) means for transmitting a second broadcast signal across the threshold along a second transmission path, said second broadcast signal being at a second phase that is different than said first phase;
(c) means for monitoring receipt of said first and second broadcast signals and for producing an event detection signal upon sequential interruption of said first and second broadcast signals within a selected period of time resulting from movement of the object through the first and second transmission paths, said event detection signal corresponding to movement of the object through the threshold in one of a first and second movement direction; and
(d) means for receiving said event detection signal and for generating a selected output in response thereto.

31. A method of detecting movement of an object through a threshold in a selected movement direction, comprising the steps of:
(a) transmitting a first broadcast signal at a first phase across the threshold and along a first transmission path;
(b) transmitting a second broadcast signal at a second phase different than the first phase across the threshold and along a second transmission path;
(c) generating an event detection signal upon sequential interruption of said first and second broadcast signals within a selected period of time resulting from movement of the object through the first and second transmission paths, with said event detection signal corresponding to movement of the object through the threshold in one of a first and second movement direction; and
(d) generating a selected output in response to said event detection signal.

* * * * *